March 31, 1970 H. L. RATLIFF, JR 3,504,122

STEREOSCOPIC TELEVISION SYSTEMS WITH MEANS TO CONTROL THE CAMERA MOVEMENT FROM A REMOTE LOCATION

Filed March 16, 1965 7 Sheets-Sheet 1

INVENTOR

Harvey L. Ratliff Jr.

INVENTOR
Harvey L. Ratliff Jr.

March 31, 1970 H. L. RATLIFF, JR 3,504,122

STEREOSCOPIC TELEVISION SYSTEMS WITH MEANS TO CONTROL THE CAMERA MOVEMENT FROM A REMOTE LOCATION

Filed March 16, 1965 7 Sheets-Sheet 3

INVENTOR

Harvey L. Ratliff Jr.

INVENTOR
Harvey L. Ratliff Jr.

INVENTOR
Harvey L. Ratliff Jr.

INVENTOR

Harvey L. Ratliff Jr.

INVENTOR
Harvey L. Ratliff Jr.

United States Patent Office 3,504,122
Patented Mar. 31, 1970

3,504,122
STEREOSCOPIC TELEVISION SYSTEMS WITH MEANS TO CONTROL THE CAMERA MOVEMENT FROM A REMOTE LOCATION

Harvey L. Ratliff, Jr., 3701 46th St., Lubbock, Tex. 79413

Filed Mar. 16, 1965, Ser. No. 440,110
Int. Cl. H04n 9/54
U.S. Cl. 178—6.5 6 Claims

ABSTRACT OF THE DISCLOSURE

There is disclosed an improvement in the taking system of a remotely controlled remote viewing system combined with a remote mobile unit which employs fisheye lenses to enable a wider angle of stereo view to be recorded upon the same area of record media and to enable distortion-free and astigmatic-free stereo re-creation when simple oculars, that due to their simplicity introduce pincushion distortion at wide angles of view, are used and which diverge the optical axes of the taking lenses to enable the recorded angle of stereo view to be still further increased by an amount equal to substantially the angle between the optical axes of the two taking lenses.

The present invention relates generally to a novel and improved wide-angle stereo taking camera adaptable for use in a remotely controlled remote wide-angle and stereoscopic system which may be mounted upon a remotely controlled mobile unit.

There are remotely controlled remote viewing systems known. However, these systems do not employ the improved taking system of the present invention. The present invention utilizes the introduction of a predetermined amount of fisheye-type barrel distortion for the purpose of stereoscopically increasing the "distortion-free" angle of view possible upon a specific amount of record media, i.e. the targets of video pickup tubes, and utilizes the divergence of the stereo taking lens axes to additionally increase the recorded angle of stereoscopic view by the amount equal to the divergence between the taking lens axes. This makes it possible for the observer using the stereo system to have more stereoscopic presence than has heretofore been possible with the known systems, which also allow head movement presence.

The present invention also contemplates the mounting of its improved system upon a remotely controlled mobile unit.

In the exploration of planets and ocean depths for example whereat there is insufficient or no air to breath and in the mobilization of defenses or in the redevelopment of areas after nuclear attack or the like whereat the air is contaminated (i.e. with radio activity) it is desirable for many different men to see, hear, speak, move about. and perform various tasks as if each of the many men were each at different points or locations at the planet, ocean depth, contaminated area or the like, although no real human being is actually at one of these locations, to breath the contaminated, insufficient or complete lack of air. It is accordingly another object of the present invention to teach an improved system whereby these tasks can be performed more readily.

In the spotting of suitable targets for aircraft attack or the like (i.e. bombing) whereat the pilot needs to fly low to draw anti-aircraft firing which points out suitable targets (as another example) it is desirable for a pilot to see, hear, move his head about, speak, and control the aircraft as if he were in the aircraft spotting the targets while he is actually safe at a distant location. It is accordingly another object of the present invention to teach a system whereby this can be accomplished.

Other objects and advantages of my invention will become apparent from a study of the following description taken with the accompanying drawings wherein.

Figure 2:
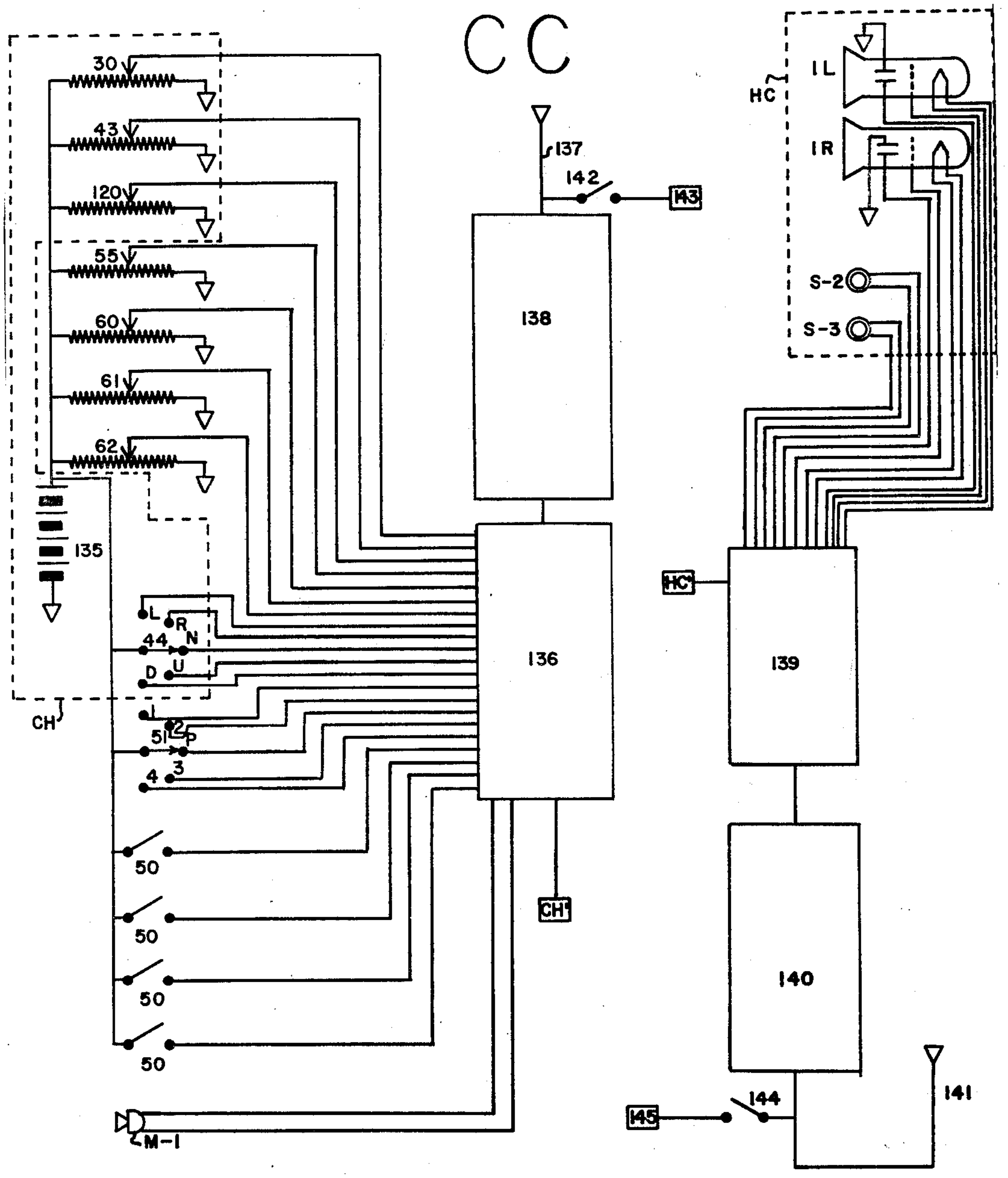
FIG. 2 is a diagrammatic illustration of a contemplated dual-mobile-control-center CC.
Figure 3:
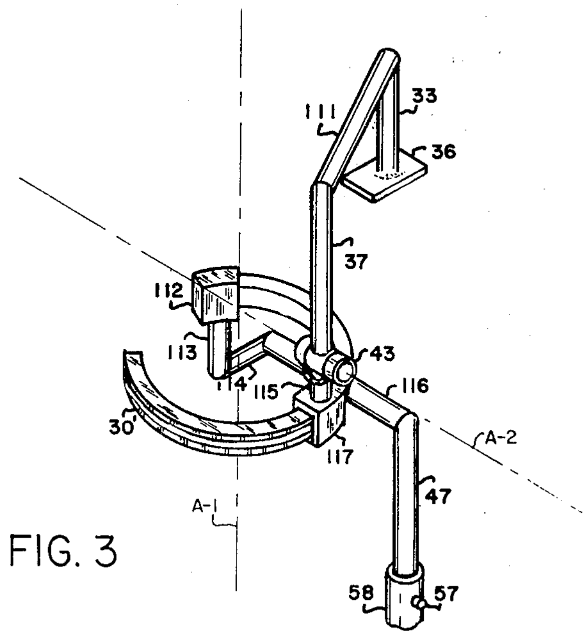
FIGS. 3 and 4 are isometric drawings illustrating head-movement-control-systems which may be used as an alternative to the one of FIG. 1.
Figure 4:
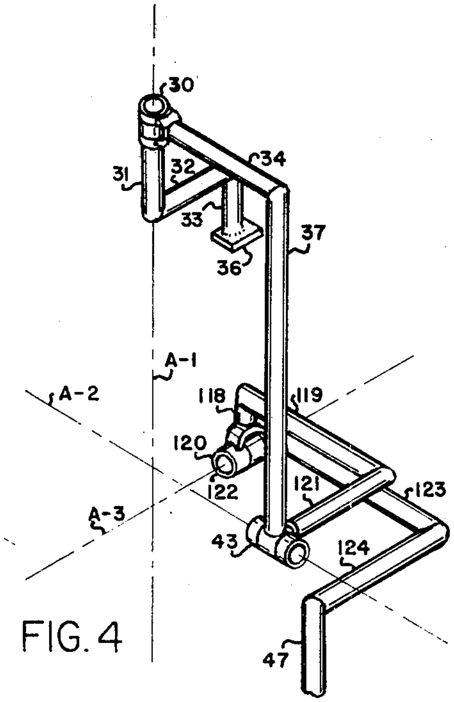

Referring more particularly to the drawings, reference is first made to FIGS. 1–4. In each dual-mobile-control-center or viewer location CC of FIG. 2 there is a first controlling soldier and a second controlling soldier (in a contemplated form of the invention). The first soldier sits in seat 59 which is supported in a well known manner or by means 65 of FIG. 1. Head attachment HC is attached to the first soldier's head with the aid of means 40 and 41 in a well known or obvious manner (i.e. as taught by M. L. Heilig in Patent No. 2,955,156). Stereophonic ear phones S–2 and S–3 are secured adjacent the ears of the first soldier with the aid of elements 39, S and 38 in a well known or obvious manner (i.e. as taught by said M. L. Heilig in said 2,955,156, 38, 39 and S functioning as 30, 31 and 32 respectively of Heilig). In the form of the invention shown in FIG. 1 it may be seen that A–2 is a stationary axis and A–1 is a rotating axis. However, in the form of the invention shown in FIG. 3 it may be seen that A–1 is a stationary axis and A–2 is a rotating axis. In the form of the invention shown in FIGS. 2 and 4 there are three axes A–1, A–2 and A–3 and three rheostats or potentiometers 30, 43 and 120. In the form of FIG. 4, A–3 is a stationary axis and both A–1 and A–2 are rotating axes, however, from the disclosure hereof a person of ordinary skill could construct a device with three axes whereby axis A–2 rotates about axis A–1 as in FIG. 3 rather than about axis A–3 as in FIG. 4. Of course other obvious modifications could be made also (such as making another axis stationary).

Figure 1:
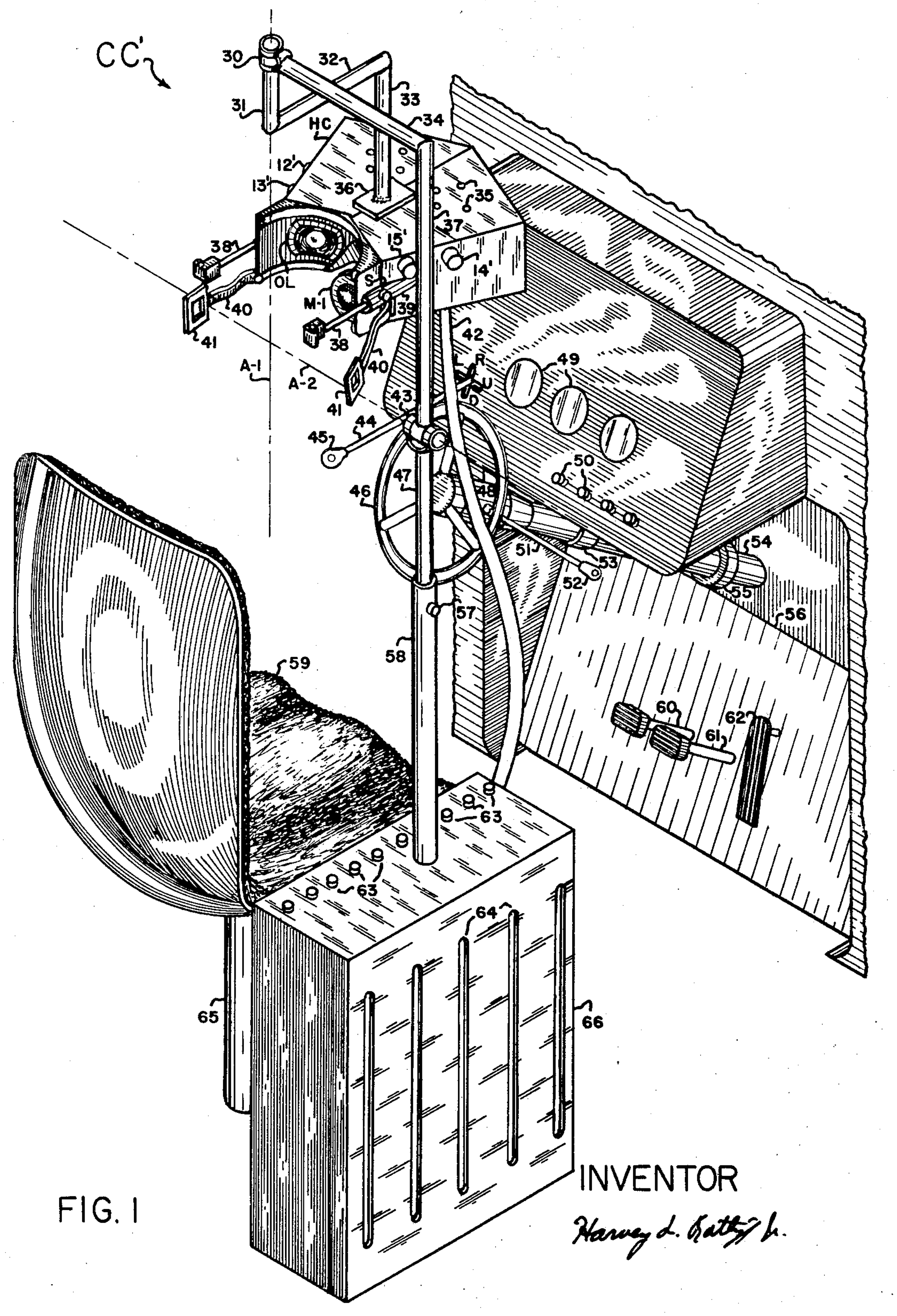
FIG. 1 is an isometric drawing showing a contemplated arrangement of the elements (as they would appear to a viewer) at an individual mobile control center CC′ or viewer housing location.

At this point the head-movement-control-systems of FIGS. 1, 3 and 4 will be described in detail, reference first being made to FIG. 1. Unit HC is rigidly secured to element 36 in a well known manner. Elements 36, 33, 32 and 31 are rigidly secured together as shown in FIG. 1.

Element 30 is a combination potentiometer (or rheostat) and joint element which allows HC to rotate about axis A–1 and changes its electronic signals (applied to amplifying system 136 (of FIG. 2)) in proportion to the rotation, this function being accomplished in a well known manner. Elements 30, 34 37 and 43 being rigidly secured together (element 43 also being a combination potentiometer and joint element) such that HC may be made to rotate about axis A–2 and electronic signals are applied to amplifier system 136 which are proportionate to the rotation about A–2. Element is also rigidly secured to element 47 which is slidably mounted in casing 58 such that the head attachment HC may be fixedly adjusted in height with the aid of set screw 57, casing 58 being rigidly secured to cabinet 66 in a well known manner. Cabinet 66 may be movably or fixedly supported by the floor.

In the system of FIG. 3 element 47 is rigidly secured to element 116, elements 116, 114, 113, 112, and 30' being rigidly secured together as shown in FIG. 3. In this system the A–1 potentiometer takes a different form 30' to allow the soldier's neck and head to fit therein, thereby allowing A–1 to be stationary and A–2 to be rotatable. Another way of making A–1 stationary and A–2 rotatable would be to construct the elements such that potentiometer 30 would be around element 65 (of FIG.1). However, it is contemplated that the system of FIG. 3 will be used to accomplish this. Runner 117 varies the amplitude of the electronic signals applied to amplifier system 136 in proportion to the rotation about A–1, elements 117, 115 and 43 being rigidly secured together as shown in FIG. 3. Elements 47, 58, 57, 43, 37, 33 and 36 co-operate together as described hereinabove for FIG. 1, element 111 rigidly securing element 33 to element 37 as shown in FIG. 3.

In the system of FIG. 4 element 47 functions as described hereinabove, elements 47, 124, 123 and 122 being rigidly secured together as shown. Element 120 (being a combination joint element and potentiometer) is rotatably mounted on element 122 (so that it may not move along axis A–3) as shown in FIG. 4 (corresponding to the manner 30 is rotatably mounted on 31 such that 30 can not move along A–1 in FIG. 1). Elements 120, 118, 119 and 121 are rigidly secured together such that HC may be made to rotate about axis A–3 in a well known or obvious manner, element 121 being rigidly secured to 43 such that HC may be made to rotate about A–2 in a well known or obvious manner. Elements 43, 37, 34, 30, 31, 32, 33 and 36 co-operate together (in FIG. 4) as described hereinabove for FIGS. 1 and 4.

In the contemplated form of the invention shown in FIG. 1, the potentiometer control 60 has the outward appearance of a clutch of an automobile, the potentiometer control 61 has the outward appearance of the brake of an automobile, the potentiometer control 62 has the outward appearance of an accelerator of an automobile and the potentiometer control 55 (along with casing 54, support 53, casing 48 and wheel 46) has the outward appearance of the steering apparatus of an automobile. However, these potentiometer controls could have just as readily been chosen to have the outward appearance of the control elements of a fixed wing aircraft, a rotary wing aircraft, a submarine, a tank, a jeep, a catapillar tractor or any mobile mechanical device or unit made by man which is made movable by its own internal power.

Also in the contemplated form of the invention shown in FIG. 1, switch control 51 (along with knob 52 and casing 48) has the outward appearance of a gear shift of an automobile, but this too could have the outward appearance of any control element required to control said mobile mechanical device made by man which is made movable by its own internal power.

Switch control 44 (along with knob 45) has no particularly well known outward appearance, but in the contemplated form of the invention, it is used to trigger four different weapons (70, 71, 72, and 73 of FIGS. 5 and 6) which will be described in greater detail hereinafter.

It may now be seen that when the first controlling soldier (introduced hereinabove) sitting in seat 59 as described hereinabove moves his head about axis A–1, A–2 or A–3 the resistance within potentiometers 30, 43 or 120 respectively is varied thereby varying the amplitude of the electronic signals applied to amplifier system 136. For the sake of description (only), it will be assumed that the resistance is decreased (thereby increasing the amplitude of the signal) by clockwise rotation for 30 as seen from above, for 43 as seen from the soldier's right, for 120 as seen by the soldier and for 55 as seen by the soldier, and by inward movement for 60, 61 and 62 as seen by the soldier. Therefore, the first controlling soldier may increase the signal output of potentiometers 30, 43, 120, 55, 60, 61 and 62 (see FIG. 2), by rotating his head to his right, rotating his head downward toward his front, rotating his head downward toward his right, rotating steering wheel 46 clockwise (as seen by him), pushing in on clutch control 60, pushing in on brake control 61 and pushing in on accelerator control 62 respectively. Likewise, he may decrease the signal output of potentiometers 30, 43, 120, 55, 60, 61 and 62 by rotating his head to his left, rotating his head upward toward his front, rotating his head downward toward his left, rotating steering wheel 46 counterclockwise, letting clutch control 60 be pushed (by a well known spring mechanism) outward, letting brake control 61 be pushed (by a well known spring mechanism) outward and letting accelerator control 62 be pushed (by well known spring mechanism) outward. The first controlling soldier may apply a first gear switching signal to 136 placing switch 51 in position 1, a second gear switching signal to 136 by placing switch 51 in position 2, a parking gear switching signal to 136 by placing switch 51 in position P, a third gear switching signal to 136 by placing switch 51 in position 3 and a fourth gear switching signal to 136 by placing switch 51 in position 4 (see FIGS. 1 and 2).

Also the first controlling soldier may apply an L triggering signal (which triggers 70) by placing switch 44 in position L, an R triggering signal (which triggers 71) by placing switch 44 in position R, no triggering signal by placing switch 44 in position N, a U triggering signal (which triggers 72) by placing switch 44 in position U and a D triggering signal (which triggers 73) by placing switch 44 in position D.

In the contemplated form of the present invention shown in the figures hereof, there are two controlling soldiers. However, there could have as readily been chosen an embodiment for one, three, four or more controlling soldiers. To second controlling soldier (introduced hereinabove) sits at a station which provides the controls within CH of FIG. 2. These controls are operated in the manner described herein above (as for the first controlling soldier). The signal outputs from the second controlling soldier's station (CH' of FIG. 2) are applied to amplifier system 136 as indicated by FIG. 2.

Immediately in front of the mouth of both the first and second controlling soldier is a microphone such as M–1 of FIGS. 1 and 2, the audio signals therefrom being applied to amplifier system 136 as shown in FIG. 2. Also the outputs from various switches 50 (some of which will be described in greater detail later) are applied to amplifier system 136 as shown in FIG. 2.

Amplifier system 136 works in a manner well known in the art of amplifying electronic signals, the output signals of 136 being applied to transmitting system 138. Transmitting system 138 works in a manner well known in art of transmitting D.C. (in the form of square waves) signals, step functions, impulse functions, audio signals and other switching signals. The signals may be modulated upon a carrier electromagnetic wave (i.e. a microwave) and transmitted through the atmosphere (or void space)

with the aid of antenna 137 or they may be transmitted with the aid of cables, transmission lines, waveguides or other means 143 of FIG. 2. Switch 142 works in a well known manner to switch from antenna 137 to transmission system 143 or vice versa.

Figures 6, 7, 8:
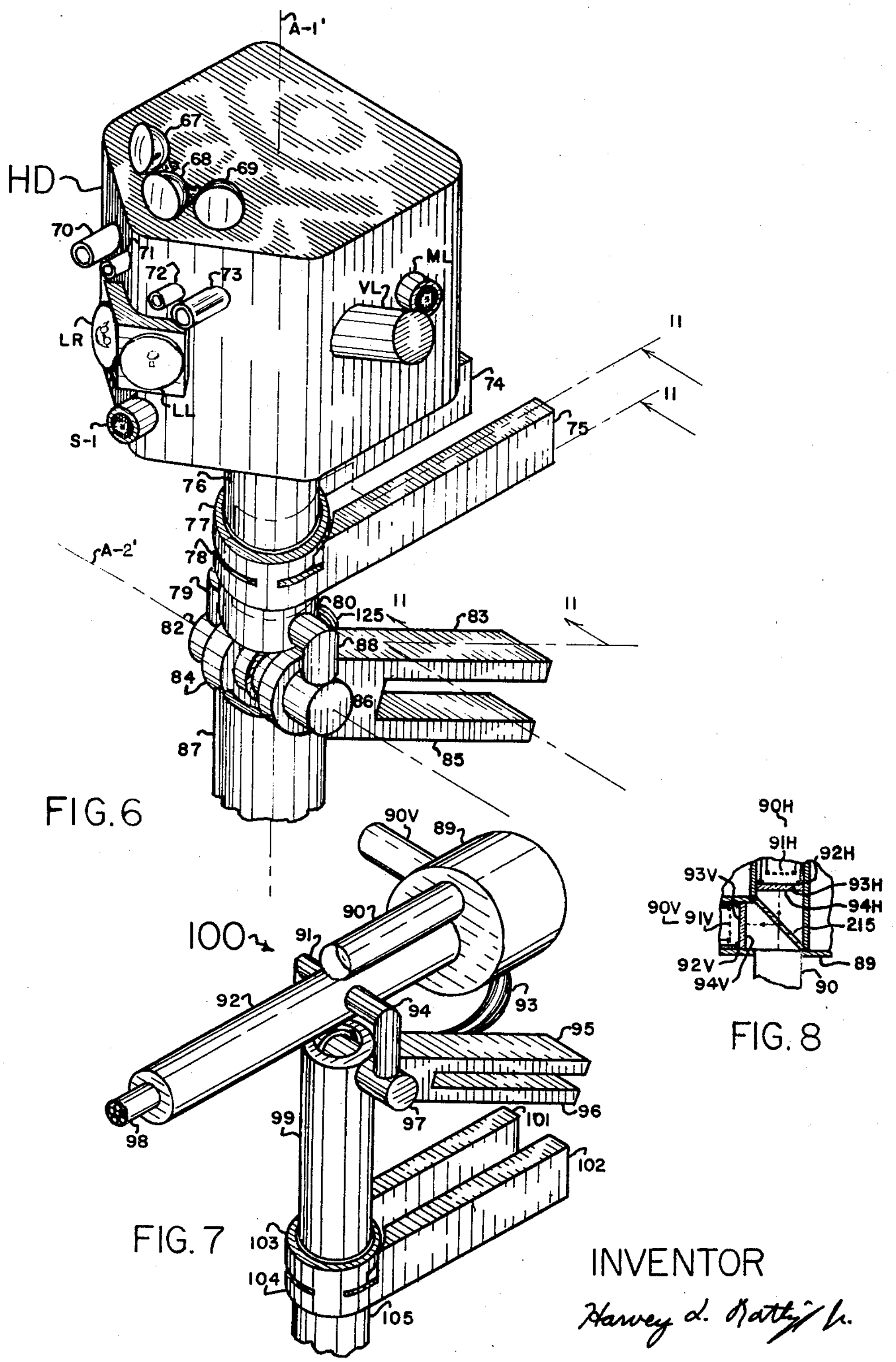
FIG. 6 is an isometric drawing illustrating a contemplated individual-controlled-head HD, which is also shown in FIG. 5.
FIG. 7 is an isometric drawing illustrating a contemplated video transmitting sub-combination, which is also shown in FIG. 5.
FIG. 8 is a partial sectional view illustrating some of the operational principles of pointer 90 of FIG. 7.
Figures 9, 10:
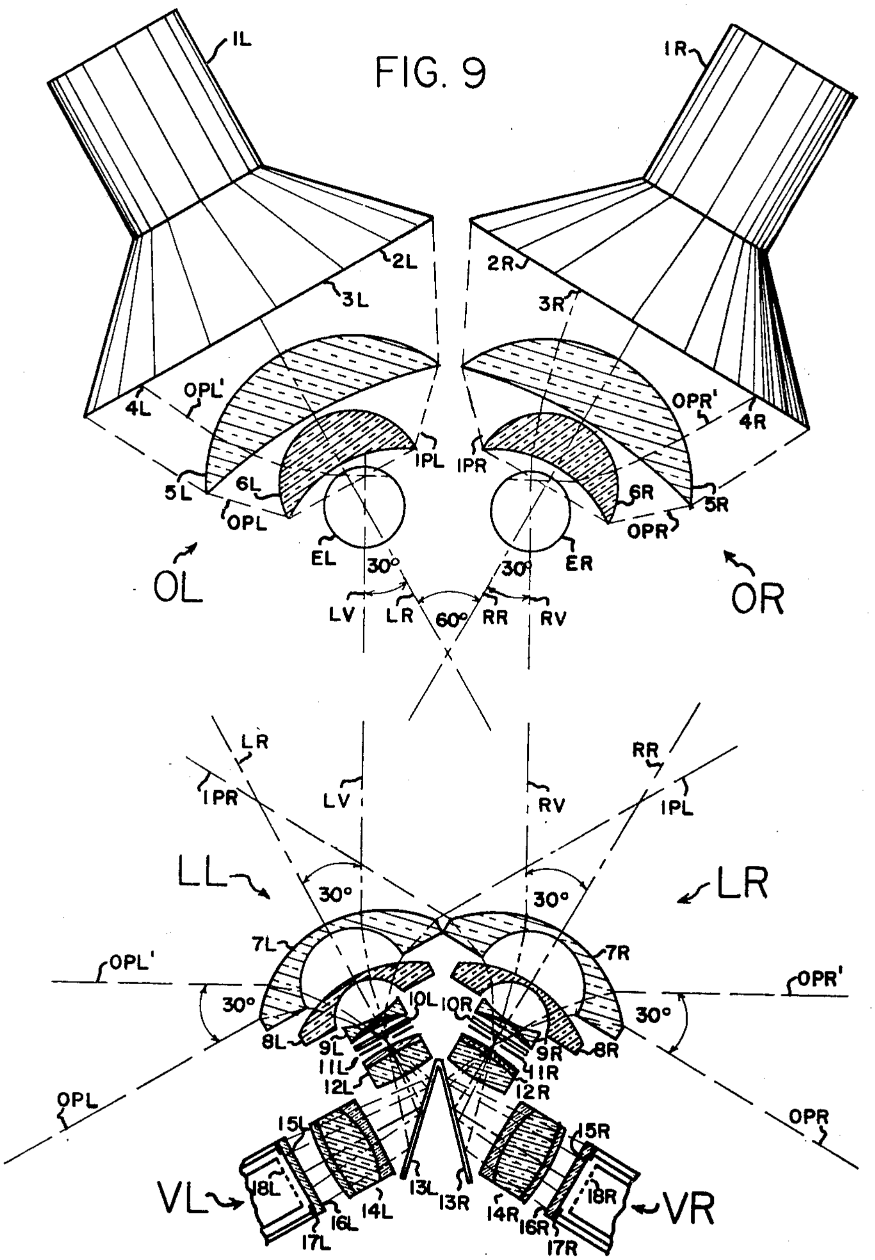
FIG. 9 is an electro-optical diagrammatic drawing illustrating the operation of the viewing means or the video optical portion of the head attachment HC of FIG. 1.
FIG. 10 is an electro-optical diagrammatic drawing illustrating the operation of the camera or video optical portion of the individual-controlled-head HD of FIG. 6.

Reference is now made to FIGS. 6 and 10. The video-optical or camera portion of mechanical-head HD will now be described. Referring to LL and LR of FIGS. 6 and 10, is may be seen that in the preferred mode of practicing the invention lens systems LL and LR are the basic "fish eye" type shown in FIG. 10; however, they could be any well known wide angle lens arrangement capable of focusing a wide-angle of view greater than 100° upon a flat surface, i.e. they could be the originial "Hill" type or the Van Albada type as set forth in my application Ser. No. 337,878, filed January 15, 1964 now U.S. Patent 3,376,381. Each system in the contemplated form of the invention has a front portion which in the contemplated design is made up of large negative meniscus lenses 7L or 7R and negative meniscus lenses 8L or 8R, a first achromatic lens system 9L or 9R, filtering elements 10L or 10R, an aperture or a diaphragm 11L or 11R, and a rear focusing portion which in the contemplated design is made up of a second achromatic lens system 12L or 12R, reflecting elements 13L or 13R and a third achromatic lens system 14L or 14R.

It is contemplated that the lens systems are arranged such that LV and RV shown in FIG. 10 are approximately 65 millimeters apart (however it may prove better to have them some other distance apart), that LR is rotated 30° (by way of example) to the left of and in the same plane with LV and RR is rotated 30° (by way of example) to the right of and in the same horizontal plane with RV.

In the specific example shown all right eye view rays within a 180° hemisphere defined by outside peripheral ray OPR and inside peripheral ray IPR and within 90° in every direction from recording axis RR pass through lens 7R, lens 8R, the first achromatic lens system 9R, filtering element 10R, aperture 11R, the second right achromatic lens system 12R, are reflected by reflecting element 13R, pass through the third achromatic lens system 14R and are focused upon target 16R of simultaneous color, ultra-violet or infra-red sensitive, or another well known type of pickup tube VR or equivalent photographic record media.

In the specific example shown all left eye view rays within a 180° hemisphere defined by outside peripheral ray OPL and inside peripheral ray IPL and within 90° in every direction from recording axis LR pass through lens 7L, lens 8L, the first achromatic lens system 9L, filtering element 10L, aperture 11L, the second left achromatic lens system 12L, are reflected by reflecting element 13L, pass through the third achromatic lens system 14L and are focused upon target 16L of simultaneous color, ultra-violet or infra-red sensitive, or another well known type of pick up tube VL. Tubes VL and VR will be described in greater detail hereinafter.

Figure 5:
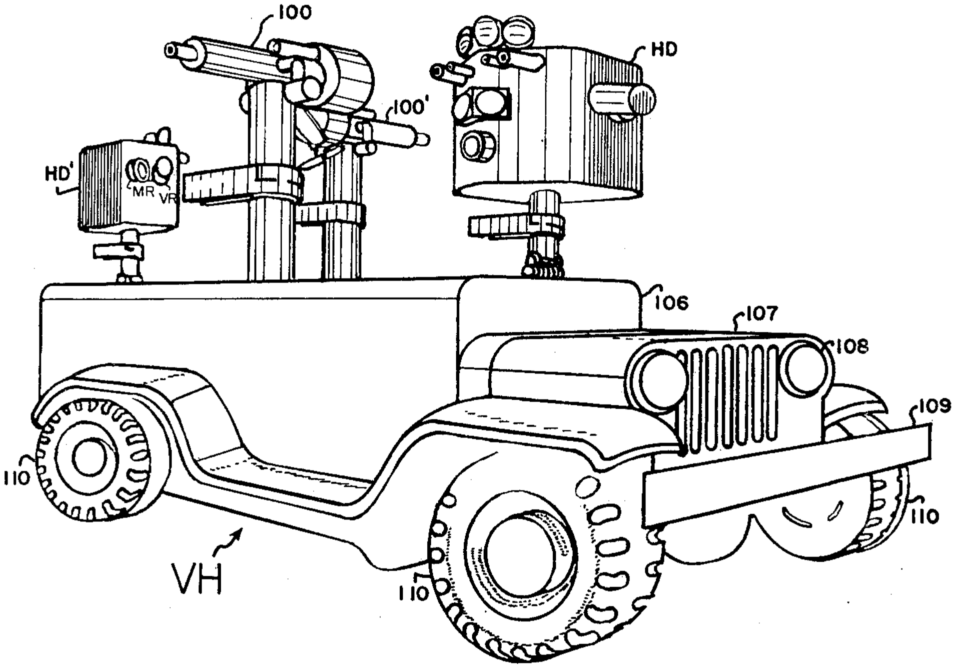
FIG. 5 is a perspective drawing showing a contemplated arrangement of the elements (as they would appear to a viewer) of a dual-mobile-controlled-vehicle VH.
Figure 14:
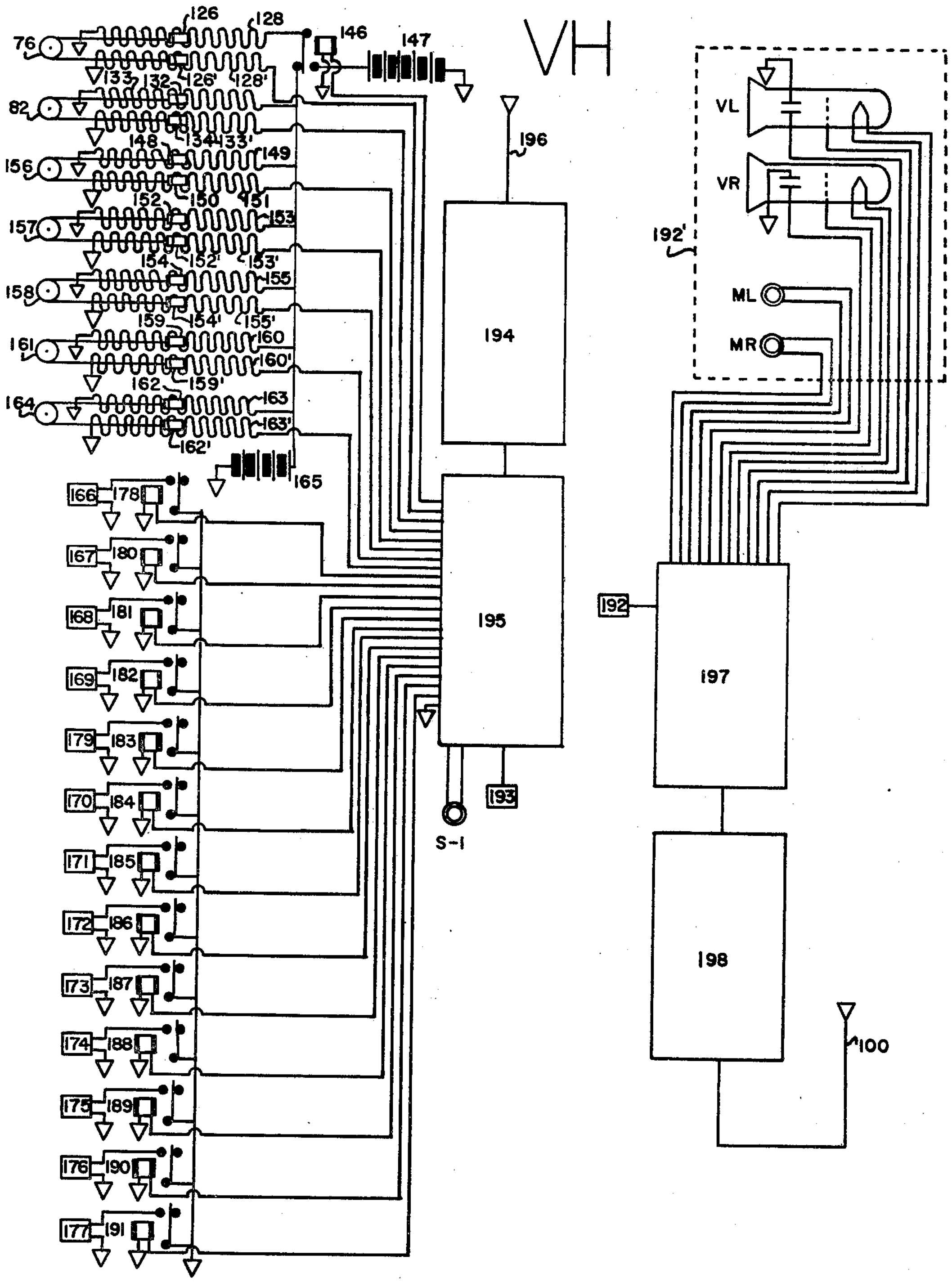
FIG. 14 is a diagrammatic illustration to show the operation of the VH unit of FIG. 5.

Reference is now made to FIGS. 5, 6 and 14. The video signals from VL and VR are amplified by amplifier system 197 in a manner well known in the art of video amplification and transmission aand transmitted by transmitting system 198 with the aid of antenna 100. Antenna 100 may be any antenna which is well known in the art of transmitting video signals or it may be of the type shown in FIGS. 5 and 7 which will be described in greater detail hereinafter. The audio signals from the stereophonic microphones ML and MR are also applied to and amplified by amplifier system 197 and transmitted by transmitting system 198 with the aid of antenna 100, the transmitted carriers being modulated with both the video and audio signals.

Reference is now made to FIGS. 1, 2 and 9. The band pass of discriminating systems 140 is adjusted such (in a well known manner) that the carrier waves are received by receiving antennas 141 or the signals are received from the underground cables, transmission lines, waveguides or other means 145 which were transmitted by system 198 and possibly other means which will be described hereinafter. Switch 144 works in a well known manner to switch from antennas 141 to transmission system 145 or vice versa. After the signals have been discriminated (or detected) from the carrier waves in a well known manner, by systems 140, they are amplified by system 139, the signals from HD being applied to 1L, 1R, S–2 and S–3 within HC and the signals from HD′ being applied to 1L, 1R, S–2 and S–3 within HC′ directly from system 139.

Referring more particularly to FIGS. 9 and 10, kinescopic tubes 1L and 1R convert the output signals of 139 into left and right images respectively upon screens 2L and 2R respectively in an electronic manner described more hereinafter. The axis of reproduction RR (which is the optical axis of ocular OR) of FIG. 9 has the same relation to the axis of right eye view RV of FIG. 9 that RR, the optical axis of LR, of FIG. 10 (which was then the right eye view recording axis) had to RV of FIG. 10. Therefore, light rays originating at point 3R of screen 2R pass through positive meniscus lenses 5R and 6R to enter eye ER along the axis of right eye view exactly as if the eye ER is looking down RV in FIG. 10. The rays along OPR′ are focused by lens system LR upon target 16R at point 15R the rays are in turn recreated at point 4R of screen 2R to enter the right eye ER at an angle 90° to the right of RV when the right eye ER is looking straight ahead. When the normal eye is looking straight ahead, it can not see further to the right than OPR′, but when a normal right eye is rotated as far to the right as possible, it can see approximately 30° more to the right or as far as as OPR (which is 120° to the right of RV). Actually IPR enters the eye ER approximately as it would in real life for the normal viewer, since the nose normally blocks some 30–50 degrees of vision in the left portion of the right eye view. All of the above may be accomplished if ocular OR is designed to be placed extremely close to ER to thereby allow lens 6R to have a relatively small diameter and thereby allowing OR to have a focal length of the order of 2 inches even though lenses 5R and 6R are meniscus lenses.

The axis of reproduction LR (which is the optical axis of ocular OL) of FIG. 9 has the same relation to the axis of left eye view LV of FIG. 9 that LR, the optical axis of LL, of FIG. 10 (which was then the left eye view recording axis) had to LV of FIG. 10. Therefore, rays originating at point 3L of screen 2L pass through positive meniscus lenses 5L and 6L to enter eye EL along the axis of left eye view exactly as if the eye EL is looking down LV in FIG. 10. The rays along OPL′ are focused by lens system LL upon target 16L at point 15L these rays are in turn recreated at point 4L of screen 2L to enter the left eye EL at an angle 90° to the left of LV when the left eye is looking straight ahead. When the normal left eye is looking straight ahead, it can not see further to the left than OPL′, but when a normal left eye is rotated as far to the left as possible, it can see approximately 30° more to the left or as far as OPL (which is 120° to the left of LV). Actually IPL enters the eye EL approximately as it would in real life for the normal viewer, since the nose normally blocks some 30–50 degrees of vision in the right portion of left eye view. All of the above may be accomplished if ocular OL is designed to be placed extremely close to the eye EL to thereby allow lens 6L to have a relatively small diameter and thereby allowing OL to have a focal length of the order of 2 inches even though lenses 5L and 6L are meniscus lenses.

It may now be seen that in the specific example set forth said first controlling soldier sees stereoscopically with 240° peripheral vision in the horizontal plane and total (or up to 180°) peripheral vision in the vertical plane exactly as if his head were in the position of HD of FIG. 5, and that said second controlling soldier sees stereoscopically with 240° peripheral vision in the horizontal plane and total (or up to 180°) peripheral vision in the vertical plane exactly as if his head were in the position of HD' of FIG. 5.

There are two inventive improvements made in the taking system of the present invention which make possible this distortion free 240° stereo peripheral visual presence at the remote location. First, there is the divergence of the optical axes of the taking lens which will increase the angle of stereoscopic view recorded upon the record media 16L, 16R by substantially the amount of the angle of divergence even if there is used a non-fisheye-type, distortion free wide-angle taking lens such as Van Albada used. (See the Van Albada citation of said Ser. No. 337,-878.) Second, there is the stereoscopic use of the "barrel distortion" producing "Hill" or "fisheye-type" taking lens to overcome the problem of "astigmatic aberration" and to introduce a predetermined amount of "reverse distortion" (i.e. barrel distortion) to neutralize the "pincushion distortion" inherent in a simple ocular system such as OR or OL of FIG. 9 at wide-angles, i.e. greater than 42° off the optical axis, which alone makes it possible to stereoscopically record extremely wide-angles of view without any divergence of the lens axes whatsoever upon a relatively small area of record media because of the "compressing" effect of the "fisheye" lens.

Reference is now made to FIGS. 5–8 and 11–14. In the contemplated form of the invention shown in FIG. 5, the vehicle VH has the outward appearance of an automobile corresponding to that of FIG. 1; however, as in the case for FIG. 1, VH could have just as readily been chosen to have the outward appearance and performance characteristics of a fixed wing aircraft, a rotary wing aircraft, a submarine, a tank, a jeep, a catapillar tractor or any mobile mechanical device made by man which is made movable by its own internl power, this being indicated by the VH of FIG. 14.

Figure 11:
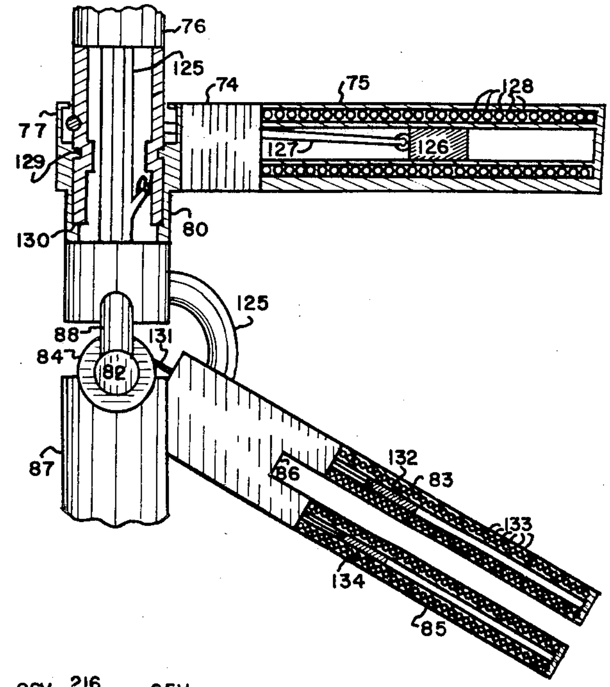
FIG. 11 is a sectional view taken along 11—11 of FIG. 6, looking in the direction of the arrows.

Referring more particularly to FIGS. 6, 11 and 14, one end of coils 128, 133, 149, 153, 155, 160, and 163 is grounded and the other end is connected to the plus terminal of a well known D.C. supply source 165 as shown in FIG. 14. The details of the operation of these coils are more clearly illustrated in FIG. 11 and will be described more completely hereinafter. The coils 128, 133, 149, 153, 155, 160, and 163 are wound (each) such that the windings are much closer together toward elements 76, 82, 156, 157, 158, 161, and 164 respectively such that the magnetic field intensity H (as defined for example on page 742 of "Physics for Students of Science and Engineering" part II second edition by David Halliday and Robert Resnick, Library of Congress Catalog Card No. 62–15336 printed by John Wiley & Sons Inc.) increases as the distance pistons 126, 132, 148, 152, 154, 159, and 162 respectively are from said elements respectively decreases thereby increasing the force upon said pistons as they get closer to said elements; however, the current flowing through coils 128, 133, 149, 153, 155, 160, and 163 respectively is constant. Said respective coils, pistons and elements are arranged such that the magnetic field intensity set up by the respective coils working in conjunction with the said respective pistons places a counter-clockwise rotational torque upon element 76 as seen from above HD, upon element 82 as seen from the right of HD, upon element 156 as seen from behind HD (element 156 working in a manner corresponding to 120 of FIG. 4 which will be described hereinafter), places a torque upon element 157 which causes leftward rotation of the front wheels of VH of FIG. 5 as seen by HD, places a torque upon element 158 which releases the clutch of VH of FIG. 5, places a torque upon element 161 which releases the brake of VH of FIG. 5, and places a torque upon element 164 which reduces the accelerator within VH of FIG. 5.

Antenna 196 picks up the modulated carrier which was transmitted from antenna 137 as described hereinabove, the signals being discriminated or detected therefrom (in a well known manner) by receiving system 194. The A–1 axis control signal is amplified by amplifier system 195 and applied to one end of coil 128', flowing through 128' to ground and back through 195; the A–2 axis control signal is amplified by amplifier system 195 and applied to one end of coil 133', flowing through 133' to ground and back through 195; the A–3 axis control signal is amplified by amplifier system 195 and applied to one end of coil 151, flowing through 151 to ground and back through 195; the steering control signal is amplified by amplifier system 195 and applied to one end of coil 153', flowing through 153' to ground and back through 195; the clutch control signal is amplified by amplifier system 195 and applied to one end of coil 133', flowing through 133' to ground and back through 195; the brake control signal is amplified by amplifier system 195 and applied to one end of coil 160', flowing through 160' to ground and back through 195; and the accelerator control signal is amplified by amplifier system 195 and applied to one end of coil 163', flowing through 163' to ground and back through 195.

Coils 128', 133', 151, 153', 155', 160', and 163' are uniformly wound such that the magnetic field intensity H is uniform in contrast with coils 128, 133, 149, 153, 155, 160, and 163, the field intensity H depending only upon the controlling signal not the positions of pistons 126', 134, 150, 152', 154', 159', and 162' respectively. The friction working in relation with pistons 126, 126', 132, 134, 148, 150, 152, 152', 154, 154', 159, 159', 162, and 162' is made great enough that the damping factor prohibits oscillatory motion of the pistons.

It may now be seen that as the respective controlling signals are increased, the respective controlling field intensities are increased (i.e. the field intensities within coils 128', 133' etc.) uniformly, while the respective biasing field intensities are constant (i.e. the field intensities within coils 128, 133 etc.) non-uniformly (i.e. the field intensity depending upon the position of the biased pistons as described hereinabove). As the controlling signals are increased (respectively) a clockwise torque is placed upon element 76 as seen above HD, upon element 82 as seen from the right of HD, upon element 156 as seen from behind HD, a torque is placed upon element 157 which causes rightward rotation of the front wheels of VH of FIG. 5 as seen by HD, placed upon element 158 which actuates the clutch of VH of FIG. 5, placed upon element 161 which actuates the brake of VH of FIG. 5, and placed upon element 164 which increases the accelerator within VH of FIG. 5. Thus movement takes place, thereby changing the position of the pistons which increases the counterforces set up by the respective biasing coils. Thus there is a force and a counterforce which causes movement until equilibrium takes place.

It may now be seen that when the first controlling soldier rotates his head about axis A–1, HD rotates about its A–1 axis in a corresponding manner; rotates his head about axis A–2, HD rotates about its A–2 axis in a corresponding manner; rotates his head about axis A–3, HD rotates about its A–3 axis in a corresponding manner; rotates wheel 46, the front wheels of VH rotate in a corresponding manner; manipulates pedal control 60, the clutch of VH responds in a corresponding manner; manipulates pedal control 61, the brake of VH responds in a corresponding manner; and manipulates pedal control 62, the accelerator of VH responds in a corresponding manner. Also when the first soldier places 51 in position 1, relay 178 is closed thereby causing actuator system 166 to place VH in first gear; places 51 in position 2, relay 180 closes thereby causing actuator system 167 to place VH in second gear; places 51 in position P, relay 181 closes thereby causing actuator system 168 to place VH in parking gear; places 51 in position 3, relay 182 closes thereby causing actuator system 169 to place VH in third gear; places 51 in position 4, relay 183 closes thereby causing actuator system 179 to place VH in reverse gear; places 44 in position L, relay 184 closes thereby causing actuator system 170 to trigger weapon 70; places 44 in position R, relay 185 closes thereby causing actuator system 171 to trigger weapon 71; places 44 in position N, there is no effect; places 44 in position U, relay 186 closes thereby causing actuator system 172 to trigger weapon 72; places 44 in position D, relay 187 closes thereby causing actuator system 173 to trigger weapon 73; closes the starter switch of switches 50, relay 188 closes thereby actuating the starter system 174 which sets VH into operation; closes the lamp switch of switches 50, relay 189 closes thereby actuating lamps 67, 68 and 69 which may be ultra-violet, infrared or ordinary light lamps; closes the head rotating switch of switches 50, relay 146 closes thereby substituting biasing source 147 for biasing source 165 which changes the current through coil 128 sufficiently to rotate the null point HD 180° (or some other desired angle) about the A–1 axis, the null point being straight ahead when relay 146 is not closed; closes the transmitter activating switch of switches 50, relay 190 closes thereby causing actuator system 176 to actuate the video and audio recording and transmitting system of VH; and closes various other of switches 50, various other of relays 191 close thereby causing various other of well known actuator systems 177 to actuate various other well known systems within VH.

Similarly when the second controlling soldier rotates his head about his A–1 axis, HD′ is made to rotate about its A–1 axis in a corresponding manner by apparatus within 193 which is identical to the corresponding apparatus for the first soldier; rotates his head about his A–2 axis, HD′ is made to rotate about its A–2 axis in a corresponding manner by apparatus within 193 which is identical to the corresponding apparatus for the first soldier; rotates his head about his A–3 axis, HD′ is made to rotate about its A–3 axis in a corresponding manner by apparatus within 193 which is identical to the corresponding apparatus for the first soldier; places his switch 44 in position L, his relay 184 within 193 closes thereby causing his actuator system 170 within 193 to trigger his weapon 70 upon HD′; places his switch 44 in position R, his relay 185 within 193 closes thereby causing his actuator system 171 within 193 to trigger his weapon 71 upon HD′; places his switch 44 in position N, there is no effect; places his switch 44 in position U, his relay 186 within 193 closes thereby causing his actuator system 172 within 193 to trigger his weapon 72 upon HD′; places his switch 44 in position D, his relay 187 closes thereby causing actuator system 173 within 193 to trigger his weapon 73 upon HD′. The video and audio pick up apparatus for HD′ is within 192 of FIG. 14, that for HD being within 192′.

The audio signals from both the first and second soldier which were modulated upon the carrier wave picked up by antenna 196 are also detected or descriminted and amplified by system 194 and 195 and respectively applied to the S–1 speakers of both HD and HD′, S–1 of HD′ being within 193.

At this point the manner in which HD or HD′ is rotated about their respective A–1, A–2, and A–3 axes will be described in greater detail, particular reference being made to FIGS. 6 and 11. It may be seen that element 76 is held from movement along but allowed to rotate about its A–1 axis (A–1′) by ridge 129 and shoulder 130 (see FIG. 11) of casing 80 which includes raised portion 77 to allow cable 127 (which is secured to pistons 126 and 126′, being wrapped around 76 as shown) to frictionally rotate 76 in response to the controlling signals as described hereinabove. Coils 128 and 128′ are supported in an insulated manner which is well known in the art of electromagnetic coils within casings 75 and 74 respectively. Pistons 126 and 126′ are slidably supported within a chamber within casings 75 and 74 respectively in the well known damped manner which prevents undesired oscillations (as shown in FIG. 11). Conduit 125 carries the video and audio signals from HD which go to 197 as described hereinabove and carries the various controlling signals from 195 to the elements respectively as described hereinabove. Casing 80 is rigidly secured to elements 79 and 88 as shown in FIG. 6, each of these respective elements being rigidly secured to pin 82 of FIGS. 6, 11 and 14. Pin 82 is supported within bearings 84 such that it may rotate about but not be moved along its A–2 axis (A–2′), bearings 84 being rigidly secured to casing 87 as shown. Cable 131 is secured at one end to piston 132, wrapped around pin 82, and secured at its second end to piston 134 as shown in FIGS. 6, 11 and 14. Coils 133 and 133′ are supported in an insulated manner which is well known in the art of electromagnetic coils within casings 83 and 85 respectively (these being bound together by 86, which is secured to 87 as shown). In the contemplated form of the invention, the A–3 axis control system works exactly as described for the A–2 axis control system with the exception that all of its elements are rotated 90° about the A–1′ (or its A–1) axis. If the system of FIG. 3 is used, the A–1 control system would be below the A–2 control system. In every other respect the elements would function as is obvious from the description of FIGS. 6, 11 and 14. From the description given hereinabove taken with the body of knowledge constituting the prior art further details of the operation of the remaining control elements of FIG. 14 should be clear to persons having skill in this art.

At this point a contemplated manner of sending the carrier wave will be described in greater detail, reference being primarily made to FIGS. 5, 7, 8, 12 and 13. It is contemplated that the video and audio carrier wave from VH be of the collimated (or focused) type such as a maser or laser beam (preferably maser) symbolized by elements 89, 92 and 98 of FIG. 7; however, as stated before herein, any well known carrier system may be used, other well known systems being operative although the desirable visual resolutions at wide-angles will be difficult to attain. It is well known that present maser carriers have a signal bandwidth with good noise performance as wide as 25 megacycles and work is being done to develop bandwidths greater than 100 megacycles, i.e. see page 24 of the brochure put out by The National Inventors Council entitled "Inventions Wanted by the Armed Forces and Other Government Agencies," Cumulative List/Volume 1, Revised March 1963, problem 974. It is generally considered that for optimum visual resolution there should be ½ cycle of bandwidth for each visual arc of 1 minute area increment at the eye of a viewing observer every $\frac{1}{16}$ of a second (i.e. see pages 31–33 of "Television Simplified" by M. S. Kiver, sixth edition, copyright 1962 by D. Van Nostrand Company, Inc.). If by way of example 180° peripheral vision was desired, only 120° (180°−60°=120°) video signals would need to be transmitted for each pick up tube. This means there would be (120×60=7200) 7200 minutes in the horizontal plane and (120×60=7200) 7200 minutes in the vertical plane, which amounts to $$(7200^2=51,800,000)$$

51,800,000 minute area increments or $$(51,800,000\times \tfrac{1}{2}=25,900,000)$$

25,900,000 cycles every $\frac{1}{16}$ second. This means there should be 16 individual maser beams for each pick up tube or (4×16=64) 64 individual maser beams for each VH unit, the entire bandwidth required for all the other signals combined being far less than 1 megacycle. Since maser beams are collimated, this should be attainable, readily.

At this point a system for modulating 16 maser beams per pick up tube will be set forth. Reference is now made to my copending prior application Ser. No. 275,411 filed April 24, 1963 now abandoned FIGS. 9 and 10. It is contemplated that in the present invention filtering (and insulating) elements such as 109, 110 and 111 of said 275,411 would be all for the same frequency (i.e. a particular color, ultraviolet, or infrared frequency) and not for different colors as described in said 275,411. In said 275,411 elements 109, 110 and 111 co-operate with elements 114, 112 and 113 respectively which co-operate with bus bars 43R, 42R and 41R as described therein. In the present invention (as contemplated) there are 16 respective elements equivalent to elements 109, 110 and 111 of said 275,411 which co-operate respectively with a second set of 16 elements (said second set being equivalent to 114, 112 and 113 of said 275,411) as 109, 110, 111 did with 114, 112, 113 respectively of said 275,411; said second set co-operate, respectively, with a third set of 16 elements (said third set being equivalent to 43R, 42R and 41R of said 275,411) as 114, 112, 113 did with 43R, 42R, 41R respectively of said 275,411. Sixteen respective sets of signals from the 16 respective bus bars of the present invention are applied to 16 respectively modulation systems which modulate 16 respective maser beams with said 16 respective sets of signals in a manner well known in the art of modulating maser carriers. Of course there is only one electron beam in each pick up tube scanning the photosensitive material (like 115 of said 275,411 or like 26 of Patent No. 2,745,773) of the present invention (in the contemplated embodiment presently being set forth) as is true in said 275,411 and 2,745,773. In said Patent 2,745,773 elements 23 correspond to elements 109, 110 and 111 of said 275,411, elements 24 correspond to elements 114, 112 and 113 of said 275,411, and elements 22 correspond to elements 43R, 42R and 41R of said 275,411. The pick up tube targets of the present invention may be made as described in said 275,411 or as described in my copending prior application Ser. No. 370,832 filed May 28, 1964, now abandoned, there being sets of 16 bus bars etc. rather than 3.

Since the microwave spectrum runs from about $10^9$ c.p.s. to about $10^{12}$ c.p.s., it may be seen that there is room for ($100\times10^9-1\times10^9=99\times10^9$ and $$999\times10^9/400\times10^6=2.49\times10^3)$$

2,490 bandwidths of 400 megacycle each, even if the carriers are not collimated and if they are collimated there is virtually no limit to how many 400 megacycle bandwidths which may be transmitted at one time. This will be more readily apparent from the description hereinafter.

In the contemplated form of the invention each of the respective modulated maser carriers is received by systems 141, 202, 204, 207, 210, or 213 in a manner well known in the art of UHF or maser reception.

At this point the maser pointing apparatus of the contemplated invention will be described in detail particular reference first being made to FIGS. 7 and 8. Rays of light pass through a well known narrow angle (i.e. 30° angle) lens arrangement with 90, ½ of them passing through half silvered (or semi-transparent) mirror (or reflector) 215 and the other one half being reflected by said 215 being focused upon targets 94H and 94V respectively of pick up tubes 90H and 90V respectively.

Figure 12:
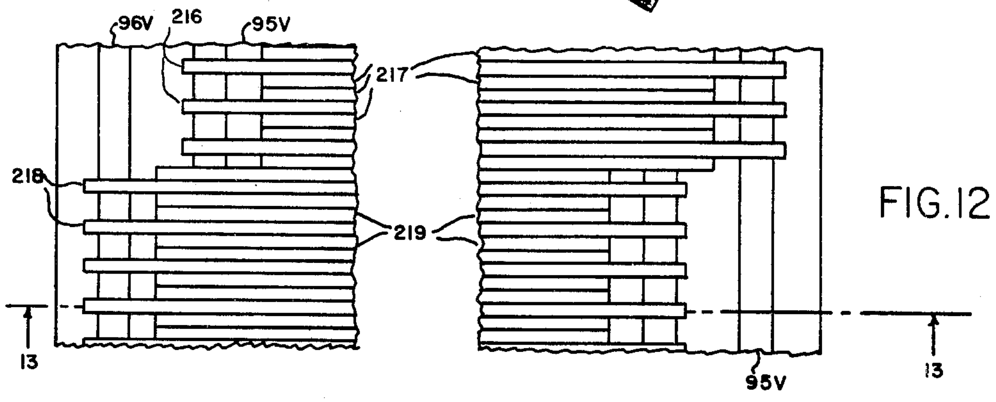
FIG. 12 is an enlarged partial sectional plan view illustrating a contemplated target usable in pointer 90 of FIG. 7.
Figure 13:
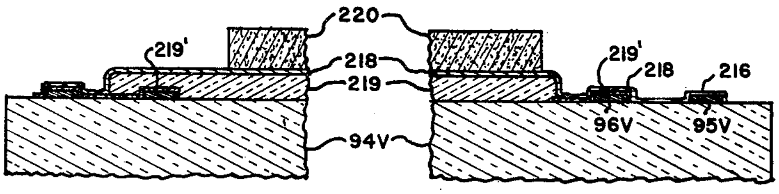
FIG. 13 is a sectional view along the line 13—13 of FIG. 12 on an enlarged scale.

At this point targets 94H and 94V and coatings 93H and 93V will be described in detail, reference being particularly made to FIGS. 12 and 13. It may be seen that coatings 93H and 93V are each made up of elements 216, 217, 218, 219, 219', and 220; 95H and 95V respectively; and 96H and 96V respectively, elements 95V and 96V being shown for example. In 93H elements 216, 217, 218, and 219 are all horizontal, elements 95H and 96H being vertical. However, in 93V elements 216, 217, 218, and 219 are all vertical, elements 95V and 96V being horizontal. In both cases elements 217 abut elements 219 at the center of the respective targets 94H and 94V.

Elements 219 and 217 are combination electromagnetic ray filters (i.e. red light filters, ultra-violet light filters) and electrical insulators and are formed upon 94V in a well known manner (i.e. as is obvious from said 2,745,773). Elements 219' can be used, if desired, to add more electrical insulation. Elements 216 and 218 are transparent electrical conductors and are formed in a well known manner (i.e. as is obvious from said 2,745,773). Layer 220 is a photosensitive material in which the resistivity decreases as the radiation intensity impinging thereon increases and is formed as shown in FIG. 13 in a well known manner (i.e. as is obvious from said 2,745,773).

In the contemplated form of the invention there is a mono-frequency radiant energy source (preferable not visible) radiating in a 360° arc from the video, audio receiving station and control signal transmitting station (i.e. 199, 205, 208, 211, and 214 of FIG. 15) which corresponds to the frequency that elements 219 and 217 will pass.

The signals from 95H are amplified and applied to electromagnetic coils (which work as described for 133' of FIG. 11) within 96 of FIG. 7, and the signals from 96H are amplified and applied to the electromagnetic coils within 95 of FIG. 7. It may now be seen that when pointer 90 points above the radiant energy pointing target of 199 (for example), electromagnet 96 pulls the strongest (more than 95), thereby causing elements 91 and 94 (therefore elements 92, 90, 89, etc.) to rotate downward about pin 97 (clockwise from the left), and when pointer 90 points below radiant energy pointing target 199 (for example), electromagnet 95 pulls the strongest, thereby causing elements 91, 94, etc. to rotate upward about pin 97, this working in a manner obvious from the hereinabove description of FIGS. 11 and 14. Equilibrium is reached when ½ the energy from said pointing target impinges upon elements 216 and the other ½ impinges upon elements 218 of target 94H, all extraneous radiations not being passed by filtering elements 217 and 219, or another well known filtering means.

The signals from 95V are amplified and applied to electromagnetic coils (which work as described for 128' of FIG. 11) within 101 of FIG. 7, and the signals from 96V are amplified and applied to the electromagnetic coils within 102 of FIG. 7. It may now be seen that when pointer 90 points to the right of the radiant energy pointing target of 199 (as seen from behind unit 100 of FIG. 7), electromagnet 102 pulls the strongest, thereby causing elements 99, 92, etc. to rotate leftward within 105 in a manner obvious from the description of FIG. 11, and when pointer 90 points to the left of the radiant energy pointing target of 199, electromagnet 101 pulls the strongest, thereby causing elements 99, 92, etc. to rotate rightward within 105 in a manner obvious from the hereinabove description of FIG. 11. Equilibrium is reached when ½ the energy from said pointing target impinges upon elements 216 and the other ½ impinges upon elements 218 of target 94V, all extraneous radiations being filtered out by filtering elements 217 and 219, or another well known filtering means.

In the contemplated form of the invention, since there are 16 maser carriers for each pick up tube as described hereinabove, the single electron beam of each pick up tube will scan its respective target (7200/16=450) 450 times every 1/16 second. In other words, there will be 450 total (retraced) scan lines for each pick up tube; however, each scan line will create 16 independent signals upon 16 independent bus bars, thereby producing the equivalent of 7200 total scan lines every 1/16 second.

The kinescope tubes (i.e. 1L and 1R) each have 16 respective electron guns which are each respectively velocity modulated in response to the signals discriminated from the 16 respective maser carriers, said signals being respectively from said 16 respective bus bars. In FIG. 27 of said 275,411, there are two clusters of three guns each (being six guns in all). In the contemplated form of the present invention there are four clusters of four guns each within each kinescopic tube (i.e. 1L or 1R within each HC or HC'). Each gun will have a tracing pattern which corresponds to the position of its respective transparent conductors (being 16 sets of transparent conductors, 450 in each set, said transparent conductors working as described hereinabove as 114, 112, and 113 of said 275,411). It may here be pointed out that if there are 675 transparent conductors in each set (of 16 each) and a total of 675 retraced scan lines for each gun of each set of 16 guns, there will be a total of 7200 retraced scan lines upon each of screens 2R and 2L of the present invention. This arrangement is considered to produce tolerable resolution for the 240° stereo-peripheral vision of the present invention. This is especially true if the scan lines are made horizontal, since 7200 scans (120°) are optimum upon each screen 2R or 2L in the vertical plane, while 10,800 scans (180°) are optimum in the horizontal plane.

There can be many monitoring screens 49 shown in FIG. 1 and many switches 63 than shown in FIG. 1. In each CC' unit a person may monitor the right-eye-view images of many respective 2R screen of each respective CC unit said images also being shown respectively upon screens 49. Of course in the preferred "fisheye" form of the invention the images upon screens 49 would appear very distorted to the naked eye, but if any particular screen 49 indicates that stereoscopic, distortion-free observation is required one of switches 63 can be thrown, thereby allowing one to look into ocular OL and OR to get first hand 240° stereo-visual and stereo-audio observation at any particular VH or HD location. Also when another of switches 63 is thrown, one individual can take over the controls of any VH or HD unit instantaneously from another individual. Of course the video and audio signals picked up by each VH and HD unit can be recorded upon tape and reviewed any time thereafter.

Of course the VH units could be powered by atomic energy or any other well known source of energy as well as by gasoline. Also as stated hereinabove, each VH unit could be a submarine, a tank, or any mobile mechanical device made by man which is made movable by its own internal power.

It may be seen that both the first and second controlling soldier in each CC unit have each up to 240° stereo-peripheral vision at any position of both HD and HD' upon their respective VH unit, that they may each rotate HD (or HD') 180° with respect to any null position thereby giving each more than 360° visual coverage with respect to any particular null position and about 180° weapon coverage with respect to any null position, that they may instantaneously rotate the null position 180° thereby giving them each 360° weapon coverage at any instant, that each VH unit has mobility which in many ways is superior to the foot soldier and in some ways is inferior to the foot soldier.

Therefore, it may be seen from the description hereinabove given, that the present invention provides a system for instantly detecting and responding to aggressive acts at locations far removed from that of the actual human soldiers in a manner equivalent to transporting the soldiers to the endangered locations instantly with very little or no danger of losing lives, that the soldiers may instantly see, hear, speak to, and destroy the enemy (while leaving friendly peoples unharmed) with virtually no danger to their lives.

It may also be seen that the present invention is readily adaptable for the exploration and exploitation of planets, ocean depths and the like, and is adaptable for redevelopment and defence after a nuclear attack or the like, producing minimum danger to lives.

By the use of satellites or high flying aircraft (or by an equivalent means), the present invention is obviously readily adaptable for use in offensive as well as defensive warfare.

The weapons of each HD unit are aimed by means of cross hairs as taught in the description of FIG. 7 (upon screen 2R) of said 270,832. The weapons each functioning in a well known manner upon being triggered as described hereinabove.

Also the telescopic lens arrangement taught in said 270,832 is readily adaptable for use in the present invention, thereby giving each CC unit superior distance vision as well as superior angular vision. Also lights 67, 68, and 69 (as pointed out hereinabove) may radiate ultraviolet light, infrared light, or the like and pick up tubes VL and VR be sensitive thereto, thereby giving each CC unit (and its respective VH unit) superior night vision without being seen by human eyes.

There is provided by way of the present invention a system with weapon coverage and triggering power at angles greater than 180° in the horizontal plane and 140° in the vertical plane with respect to a single null position, which weapon the soldier points by merely moving his head; and if switch 50 for 146 is used, the soldier has weapon coverage and triggering power at angles greater than 360° in the horizontal plane and 280° in the vertical plane. The soldier has stereo-visual coverage responsive to his eye movements and head movements which is equal to the weapon coverage plus the angle of view provided by his visual means. If the system of FIGS. 9 and 10 is used, he has stereo-visual coverage greater than up to 240° horizontally and up to total or 180° vertically plus the head movement coverage. He may move about in a manner which is in many ways superior to that of a foot soldier, and if his instrument of movement is a submarine in the sea, he will have superior mobility to substantially any other occupant of the sea (as an example). As the system is perfected, his mobility characteristics can be improved indefinitely. All of this takes place while the soldier is actually safe and far removed from the dangerous action.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

What I claim is:

1. In a remotely controlled remote wide-angle and stereoscopic viewing system having a mobile unit, a first means, a second means supporting said first means upon said mobile unit and responsive to electronic signals whereby said first means can be rotated about a first and second axis, wide-angle stereoscopic viewer housing at a location remote to said mobile unit, a first and second wide-angle ocular lens means supported by said viewer housing such that the respective optical axes of said ocular lens means make a predetermined angle greater than zero with respect to each other, first and second video pick up means having respective targets perpendicular to axes having angles corresponding to said predetermined angle and supported by said first means, first and second video reproduction means with each respective screen thereof substantially at the respective focal plane of the respective ocular lens means and large enough to substantially fill the respective ocular therefor, third means to communicate the signals picked up by the video pick up means to the video reproduction means, head motion electronic signaling means supporting said viewer housing whereby motion of said housing about a first axis produces a first set of head movement electronic signals and motion of said housing about a second axis produces a second set of head movement electronic signals, fourth means of communicating the head movement signals to said second means whereby said first means moves substantially the same as said viewer housing, the improvement in a wide-angle stereoscopic taking system, said improvement comprising: a stereoscopically coupled first and second wide-angle taking lens means focusing their respective images upon the respective said targets and mounted upon said first means upon said mobile unit, each said taking lens having only one respective optical axis which make a predetermined angle greater than zero with each other whereby the recorded angle of stereoscopic view is additionally increased by the amount of said predetermined angle.

2. In a remotely controlled remote wide-angle and stereoscopic viewing system having a first means, a second means supporting said first means and responsive to electronic signals whereby said first means can be rotated about a first and second axis, wide-angle stereoscopic viewer housing at a location remote to said first means, a first and second wide-angle ocular lens means supported by said viewer housing such that the respective optical axes of said ocular lens means make a predetermined angle greater than zero with respect to each other, first and second video pick up means having respective targets perpendicular to axes having angles corresponding to said predetermined angle and supported by said first means, first and second video reproduction means with each respective screen thereof substantially at the respective focal plane of the respective ocular lens means and large enough to substantially fill the respective ocular therefor, third means to communicate the signals picked up by the video pick up means to the video reproduction means, head motion electronic signaling means supporting said viewer housing whereby motion of said housing about a first axis produces a first set of head movement electronic signals and motion of said housing about a second axis produces a second set of head movement electronic signals, fourth means of communicating the head movement signals to said second means whereby said first means moves substantially the same as said viewer housing, the improvement in a wide-angle stereoscopic taking system, said improvement comprising: a stereoscopically coupled first and second wide-angle taking lens means focusing their respective images upon the respective said targets and mounted upon said first means, each said taking lens having only one respective optical axis which makes a predetermined angle greater than zero with the other whereby the recorded angle of stereoscopic view is additionally increased by the amount of said predetermined angle.

3. In a remotely controlled remote wide-angle and stereoscopic viewing system having a mobile unit, a first means, a second means supporting said first means upon said mobile unit and responsive to electronic signals whereby said first means can be rotated about a first and second axis, wide-angle stereoscopic viewer housing at a location remote to said mobile unit, a stereoscopically coupled first and second wide-angle ocular lens means which inherently introduces a predetermined amount of pincushion distortion at wide angles of view and supported by said viewer housing such that the respective optical axes of said ocular lens means make a predetermined and operative angle with respect to each other, first and second video pick up means having respective targets perpendicular to axes having angles corresponding to said predetermined angle and supported by said first means, first and second video reproduction means with each respective screen thereof substantially at the respective focal plane of the respective ocular lens means and large enough to substantially fill the respective ocular therefor, third means to communicate the signals picked up by the video pick up means to the video reproduction means, head motion electronic signaling means supporting said viewer housing whereby motion of said housing about a first axis produces a first set of head movement electronic signals and motion of the said housing about a second axis produces a second set of head movement electronic signals, fourth means of communicating the head movement signals to said second means whereby said first means moves substantially the same as said viewer housing, the improvement in a wide-angle stereoscopic taking system, said improvement comprising: a stereoscopically coupled first and second fisheye-type wide-angle taking lens means for introducing a predetermined amount of barrel distortion required to nullify the pincushion distortion introduced by said oculars and focusing their respective images having said barrel distortion upon the respective said targets and mounted upon said first means upon said mobile unit, each said taking lens having one respective optical axis which makes a predetermined and operative angle with the other.

4. The improvement of claim 3 wherein the predetermined angle between the optical axes of the taking lenses is greater than zero.

5. In a remotely controlled remote wide-angle and stereoscopic viewing system having a first means, a second means supporting said first means and responsive to electronic signals whereby said first means can be rotated about a first and second axis, wide-angle stereoscopic viewer housing at a location remote to said first means, a stereoscopically coupled first and second wide-angle ocular lens means which inherently introduces a predetermined amount of pincushion distortion at wide angles of view and supported by said viewer housing such that the respective optical axes of said ocular lens means make a predetermined and operative angle with respect to each other, first and second video pick up means having respective targets perpendicular to axes having angles corresponding to said predetermined angle and supported by said first means, first and second video reproduction means with each respective screen thereof substantially at the respective focal plane of the respective ocular lens means and large enough to substantially fill the respective ocular therefor, third means to communicate the signals picked up by the video pick up means to the video reproduction means, head motion electronic signaling means supporting said viewer housing whereby motion of said housing about a first axis produces a first set of head movement electronic signals and motion of said housing about a second axis produces a second set of head movement electronic signals, fourth means of communicating the head movement signals to said second means whereby said first means moves substantially the same as said viewer housing, the improvement in a wide-angle stereoscopic taking system, said improvement comprising: a stereoscopically coupled first and second fisheye-type wide-angle taking lens means for introducing a predetermined amount of barrel distortion to nullify the pincushion distortion introduced by said oculars and focusing their respective images having said barrel distortion upon the respective said targets and mounted upon said first means upon said mobile unit, each said taking lens having one respective optical axis which makes a predetermined angle with the other.

6. The improvement of claim 5 wherein the predetermined angle between the optical axes of the taking lenses is greater than zero.

References Cited

UNITED STATES PATENTS

| | | | |
|---|---|---|---|
| 2,223,630 | 12/1940 | Levy | 98—18 |
| 3,045,573 | 7/1962 | Wanner | 95—15 |
| 3,055,265 | 9/1962 | Smith | 95—15 |
| 3,376,381 | 4/1968 | Ratliff | 178—6.5 |
| 2,359,032 | 9/1944 | Gott | 178—6 |
| 2,892,290 | 6/1959 | Ryan | 318—16 |
| 2,955,156 | 10/1960 | Heilig | 178—6.5 |
| 3,007,538 | 11/1961 | Hill | 180—98 |
| 3,198,279 | 8/1965 | Quinn | 180—98 |
| 3,205,303 | 9/1965 | Bradley. | |
| 3,209,073 | 9/1965 | Falbel | 178—6.8 |

ROBERT L. GRIFFIN, Primary Examiner

J. A. ORSINO, Jr., Assistant Examiner

U.S. Cl. X.R.

35—25; 95—15; 178—6.6, 6.8; 180—98; 318—16